Patented Oct. 24, 1933

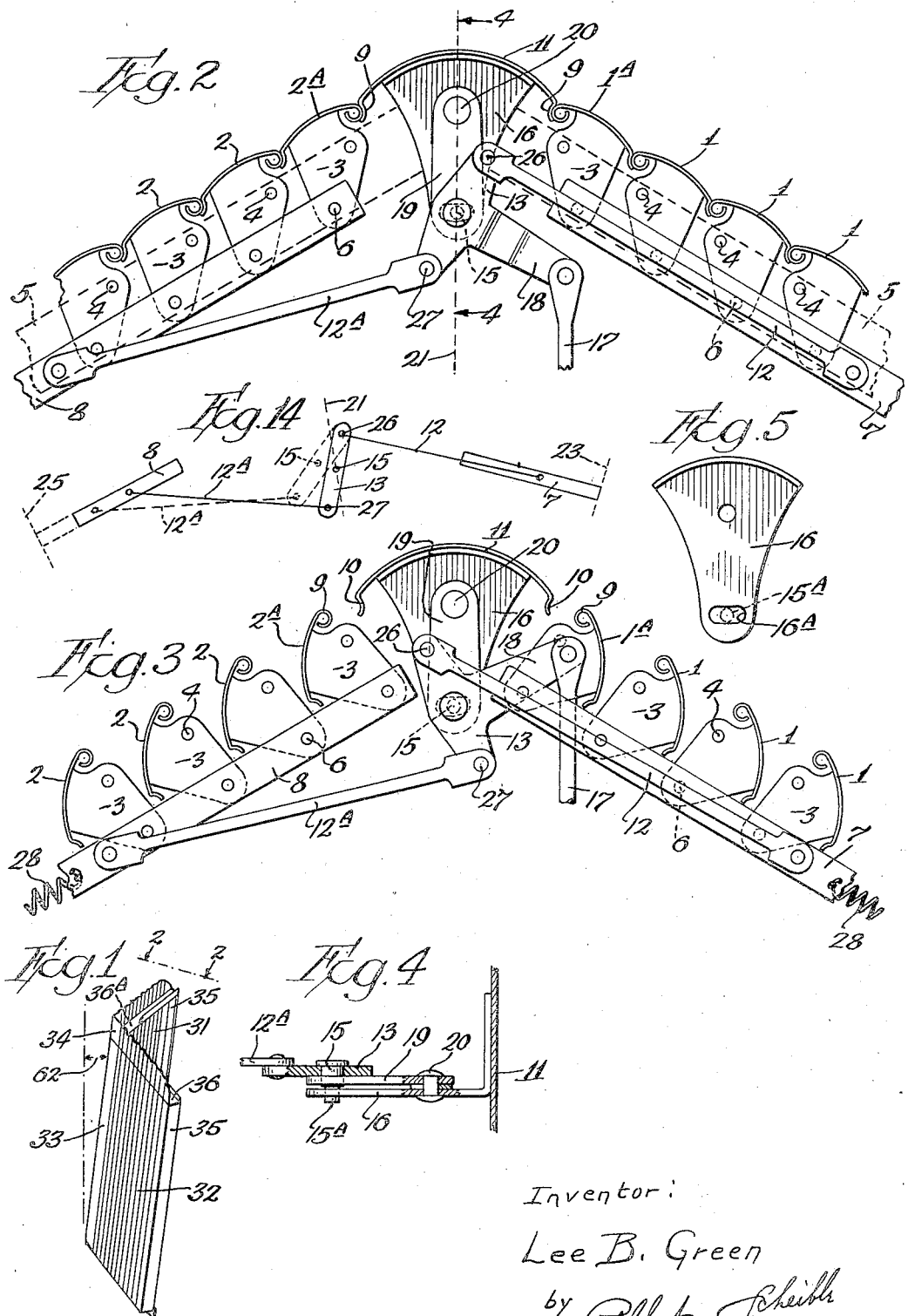

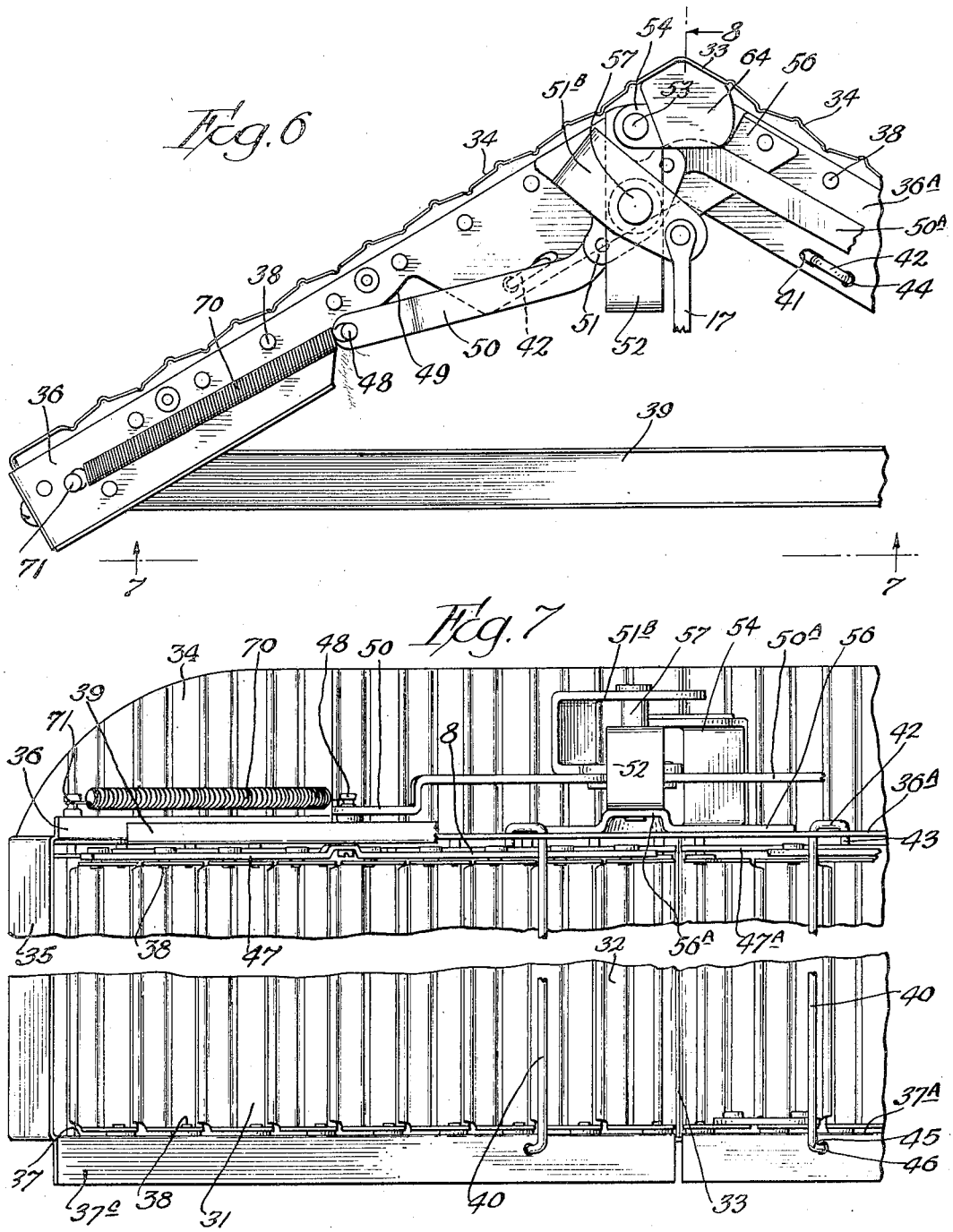

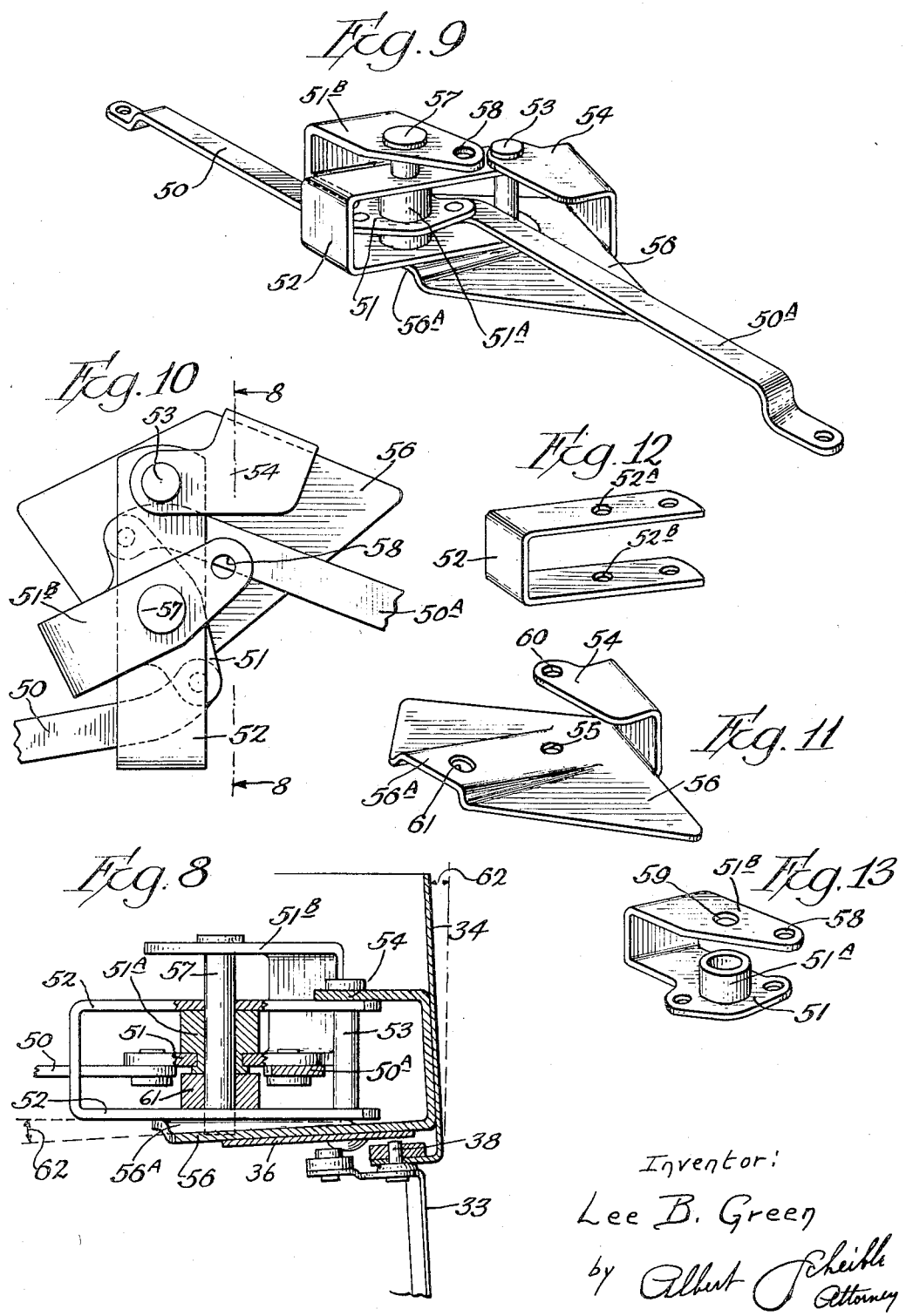

1,932,244

UNITED STATES PATENT OFFICE 1,932,244

TWIN-SHUTTER ACTUATING MECHANISM

Lee B. Green, Lakewood, Ohio, assignor to The Globe Machine & Stamping Company, Cleveland, Ohio, a corporation of Ohio Application January 2, 1931. Serial No. 506,121

15 Claims. (Cl. 189—62)

My invention relates to mechanisms for conjointly opening or closing each of several sections of a multi-section shutter, and in its general objects aims to provide an actuating mechanism which will insure a complete closing and a complete opening of every section of the shutter, which will be equally effective when the several sections have their shutter-blades disposed in different planes, and which will operate without any cramping or binding of any part of the mechanism even when an actuating pull on the mechanism is in a direction which would tend to cramp the mechanism. Furthermore, my invention aims to provide simple and effective means for adding rigidity to a shutter and frame assembly embodying a mechanism, so as to resist certain strains to which the frame may be subjected in practice.

In one of its more particular aspects, my invention relates to mechanisms suitable for conjointly opening or closing two shutter sections when these sections have their blades extending in the same general direction and when the blades of the two shutter sections are to be swung in relatively opposite directions during their closing movement. For such a shutter arrangement, my invention aims to provide an actuating mechanism which will operatively connect the two shutter sections in such a manner as to compensate for manufacturing variations in the manufacture and assembly, and for a difference in relative angular relations of corresponding mechanism portions associated with the two sections, thereby ensuring a continued closing movement of the blades of one section in case of an earlier closing of the blades of the other section.

Furthermore, my invention aims to provide a twin-shutter actuating mechanism in which the mechanism is arranged for halting the opening movement of the blades of both shutter sections with adjacent blades in each section freely spaced from each other, so as to avoid the rattling which would occur if an edge portion of each blade (in the open position of the shutter) engaged an adjacent blade after the manner heretofore proposed.

In still another aspect, my invention relates to a twin shutter assembly in which the general planes of the closed blades in the two sections are disposed at an angle to each other after the manner of two adjacent side faces of an imaginary prism or pyramid, and in which all of the shutter blades are pivoted on axes longitudinal of the said imaginary prism or pyramid. For such a shutter arrangement, my invention aims to provide an actuating mechanism which will halt all of the opened shutter blades when these blades are effectively disposed in planes parallel to a third plane extending along the said line of intersection and bisecting the angle between the aforesaid two planes; and which will also permit the actuating pull on the mechanism to be in a line parallel to the base of the said prism or pyramid, without cramping any portion of the mechanism.

In one of its immediate commercial aspects, my invention is particularly suitable for use in connection with a twin-section radiator shutter for an automobile which has the front face of the enclosure for the radiator formed of two forwardly converging panels, and in which each shutter section is disposed for controlling the flow of air through one of the panels. Hence I am describing my invention in embodiments suitable for use with such a frontal automobile construction in the accompanying specification, from which further and more detailed objects of my invention will also appear, and am illustrating such embodiments in the accompanying drawings, in which Fig. 1 is a perspective view of a frontal portion of the radiator enclosure of an automobile, showing the closed position of both shutter-blade sections in a shutter assembly of the above described class.

Fig. 2 is an enlarged plan view of the central portion of the same radiator portion taken from the line 2—2 of Fig. 1, including a suitable operating mechanism and its connections to the blades of the two sections, with the blades in their closure positions.

Fig. 3 is a view similar to Fig. 2 but taken when the shutter blades are fully opened.

Fig. 4 is a fragmentary vertical section taken along the line 4—4 of Fig. 2.

Fig. 5 is a plan view of the supporting bracket of the actuating mechanism.

Fig. 6 is a fragmentary plan view of a twin-shutter, shutter-front and actuating mechanism assembly showing a present commercial embodiment of my invention, and Fig. 7 is a fragmentary rear view of the same assembly.

Fig. 8 is a fragmentary and enlarged vertical section, taken along the line 8—8 of Fig. 6.

Fig. 9 is a perspective view of the mechanism interposed between the shutter bars associated with the two shutter sections.

Fig. 10 is an enlarged plan view of the same mechanism, with portions of the two links broken away.

Figs. 11, 12 and 13 are perspective views respectively of the supporting member, the pivot member, and the rocking lever of the mechanism.

Fig. 14 is a diagrammatic view.

While my invention is equally applicable for use in connection with twin shutters (or shutter sections) in which all of the shutter blades are disposed in substantially common plane, some of its advantages apply all the more when the two closed shutter blades of the two sections are disposed in different planes, as for example with shutters for automobiles in which the radiator enclosure presents a front of V-shaped horizontal section. So also, some features of my invention are particularly advantageous when the assembly is such that the V-shaped radiator front slopes downward forwardly, when the two shutter blade sections are spaced from each other, and when the pull for opening the mechanism is not at the same level as the shutter bars. Hence I am here illustrating and describing my invention more particularly in connection with a shutter and shutter-actuating assembly suitable for use in connection with such a tilted and V-sectioned radiator front in which each shutter section controls the flow of air through a separate panel opening in the said front, although I do not wish to be limited to this particular application.

Referring first to Figs. 2 and 3, these show plan views of a simple twin-shutter actuating mechanism embodying my invention, together with a part of the blades of the blade-connecting shutter bar of each section, the shutter-blade supporting frame being omitted, since it forms no part of my present invention. In this embodiment, each upright shutter blade 1 or 2 is fastened to a rearwardly projecting wing 3 which is pivoted on a trunnion 4 projecting upward from the shutter frame 5. Each such blade wing is also connected by a trunnion 6 to a shutter bar (7 or 8) by means of which all blades of the corresponding shutter or shutter section can simultaneously be moved from their closure position of Fig. 1 to their full open position of Fig. 2.

When either set of shutter blades is moved toward its closure position, the movement in that direction is halted by stop means associated with the blades of that set. For this purpose, each blade here has its forward edge portions 9 curled to a tubular formation, and when the blades of each section are closed, the curled edge portion 9 on the blade 1A or 2A nearest the middle of the shutter engages a correspondingly concaved stop shoulder 10 on a stationary middle portion 11 of the radiator-enclosing front with which the shutter is associated.

The shutter bar 7 is connected by a link 12 to one arm 13 of a rocking lever (or lever of the first class) and the other arm 18 of this lever is connected by a companion link 12A to the other shutter bar 8, the lever being journaled between these lever arms on a riser pin 15 supported by a bracket 16 which bracket is here shown as supported by the panel front portion 11. A tension spring 28 interposed in the usual manner between the shutter frame 5 and the shutter bar 7 continually urges that bar in a direction tending to close the corresponding set of shutter blades, and a companion spring 28 acts similarly on the bar 8 connected to the other set of blades, and the rocking lever tends to equalize the oppositely directed movement of the two shutter bars.

However, it will be obvious from Figs. 2 and 3 that the two links 12 and 13 extend at different horizontal angles to the general planes of the corresponding shutter blades when these blades are closed, and that these angles do not change to an equal extent during the movement of the actuating mechanism. Consequently, the relative lengths of the two links 12 and 12A, as also the effective lengths of the two lever arms, would need to be proportioned with a high degree of accuracy to insure a simultaneous and complete closing of both sets of shutter blades if the pivot pin 15 for the rocking lever is stationary. And even with a theoretically accurate proportioning of the various parts, the desired complete simultaneous closure (which is particularly important on cold wintry days) cannot readily be secured in the commercial manufacture of such shutter and front assemblies, owing to the gradual wear of tools, lack of uniform bending or drilling of various parts, etc. Consequently, one set of shutter blades would close before the other one, and the halting of the closure movement for that set would operate through the link and lever connections to hold the blades of the other set in a partially opened position, thereby still admitting air and also causing a rattling of the incompletely closed blades against each other.

To overcome this, I do not mount the lever-pivoting trunnion 15 in a stationary position, but provide means associated with the support for this trunnion whereby this trunnion can move after one set of shutter blades is halted in its closure position; thereby permitting a further movement of the operating rod 17 in the shutter-closing direction to swing the lever about its pivotal connection to the link associated with the already closed shutter section, so that the lever will then move (about another axis than the one on which it is pivoted) to effect the complete closing of the other shutter section.

For this purpose, I support the lever-pivoting trunnion 15 from the supporting member, namely the bracket 16, through the intermediary of a compensating member or pivot member which is free to move horizontally (in the general direction in which both of the links 12 and 12A extend) with respect to the said support. Thus I am here showing this lever-pivoting trunnion 15 as mounted upon a pivot member 19 extending freely between the bracket 16 and the lever 13, the pivot member being pivoted to the bracket on a second pivot pin 20 parallel to and spaced from the trunnion 15. With the pivot member 19 so disposed that the common plane 21 of the axes of the pivot pins 20 and the trunnion substantially bisects the angle at which the shutter blades of the two sections extend when closed, or at right angles to the common general plane of all of closed shutter blades in case the two sections do not diverge, the pivot member then permits the rocking lever 13 to swing bodily in a direction at right angles to the said plane, after the manner shown diagrammatically and to a greatly exaggerated extent in Fig. 14.

In this figure, the dotted line 23 indicates the position of the outer end of the shutter bar 7 when this has closed the shutter blades of one section, while the line 25 indicates the position which the outer end of the companion shutter bar 8 must reach to effect the closing of the shutter blades of the other section. During the movement of the two shutter bars toward their illustrated positions the movement of the lever may be entirely about the axis 15 of the lever-pivoting trunnion.

But as soon as the earlier closing shutter section 12 has been halted by the closing of the blades which it moves, the further action tending to close the other shutter section will rock the lever about the pin 26 by which the rocking lever is pivotally connected to the link 12 leading to the shutter bar 7. Consequently, the rocking lever will swing bodily in the general plane in which the two links 12 and 12A extend, so as to move the companion shutter bar to its closure-effecting position as shown in dotted lines in this diagrammatic figure.

In practice, only a relatively small bodily shifting of the axis of the lever-pivoting trunnion 15 is required for this purpose, particularly since this trunnion is disposed between the two pivot pins (26 and 27) which respectively connect the two links to the lever, so that the rocking of the lever about one of these pins moves the said trunnion to a much less extent than the other pin. Hence the trivial shifting of the lever needed for this purpose can readily be obtained while still providing means for limiting this shifting of the lever so as not to have it interfere with an approximately uniform movement of both sets of shutter blades during either the opening or the closing of these blades. In the embodiment of Figs. 2 to 4, the lever-supporting bracket 16 has a slot 16A through which the lower end portion 15A of the lever-pivoting trunnion extends, this slot being of such a limited length as to permit the needed shifting of the lever during the final period of the shutter-blade closing, while presenting the ends of the slot so that they will engage the said trunnion pin portion to prevent an undue amount of such shifting.

In practice, I desirably construct mechanisms of the above described general nature so as to afford a pair of vertically spaced bearings both for the trunnion on which the rocking lever is pivoted and for the pin on which the lever is pivoted to the bracket or other supporting portion of the mechanism. And when the two shutter sections are not at a right angle to the plane of operation of the pull rod 17 which actuates the mechanism to open the shutters, I also construct the support so as to compensate for the deviation from that angle.

Illustrative of an embodiment including such additional structural features, Fig. 7 shows a fragmentary rear elevation of a shutter, shutter front and mechanism assembly designed for an automobile in which the two shutter sections and the adjacent stationary shutter front portions slope rearwardly upward and also diverge rearwardly, so that the two shutter sections extend along two adjacent faces of an imaginary pyramid as shown somewhat diagrammatically in Fig. 1.

In this embodiment, the two sets of blades 31 and 32 extend at opposite sides of a central riser strip 33 of the shutter front, and this strip as well as both sets of blades are surmounted by a horizontal top strip 34 which is vertically corrugated to correspond in appearance to the closed shutter blades. The blades of the two sections have their pivoting trunnions 38 respectively pivoted in two relatively diverging halves of the horizontal members of an upright shutter frame which is supported close to the said shutter front portions. This frame includes two riser members 35 connected by upper and lower horizontal frame members 36 and 37, each of the latter two members comprising two relatively diverging portions (36 and 36A, and 37 and 37A), and the ends of the angular upper frame member 36 being connected by a rigid spanner 39 which adds rigidity to the frame at approximately the level of the actuating mechanism.

Then I desirably also provide at least one upright tension member 40 connecting the bottom frame member with the top frame member, and preferably employ two such tension members at opposite sides of the middle of the frame and nearer to the middle of the frame than to the sides of the frame. These tension members prevent the top and bottom frame members from bulging apart, and may be simple suitably bent rods hookingly attached to the upper and lower frame members. Thus, Figs. 6 and 7 show each such tensioning member 40 as extending vertically through a perforation 41 in the upper frame member 36 and having an upper portion 42 which overhangs that frame member and which has its tip portion 43 extending downward through an adjacent perforation 44 in the same frame member, the tensioning member also having at its lower end a portion 45 hooked through a perforation 46 in a depending flange 37C on the lower frame member 37. By forming the tip of lower end portion 45 as a hook and having the horizontal portion extend in a different horizontal direction from the upper part 42, I cause the resiliency of the member to hold the hook interlocked with the said flange, so that no auxiliary fastening element is required.

To operate the shutter blades, each set of these (31, 32) is connected in the usual manner similar to that in Figs. 1 and 2 to a reciprocable shutter bar (47, 47A), each of which bars is connected to one of the mechanism links by a pin 48 extending through a rearwardly open notch 49 in the upper frame member. A tension spring 70 connects each such pin 48 with a pin 71 on the upper frame member and continually urges the corresponding shutter bar in the shutter-closing direction, the arrangement being similar and symmetrical in both halves of the shutter assembly.

Each shutter bar pin 48 also extends through an end of one of the two links (50 and 50A) which form part of the operating mechanism and which links have their other ends respectively connected to the opposite arms of a rocking lever 51, as shown in Fig. 9. This lever is pivoted between the horizontal shanks of a U-shaped pivoting member 52 on an upright pivot pin 53 which depends from an overhanging arm 54 on a supporting member and which pin 53 also extends through a perforation 55 in the medial portion 56A of the base of this supporting member.

To secure spaced bearings for the pin 57 by which the rocking lever 51 is pivoted to the pivoting member, and to hold this lever in the desired plane, I desirably construct the lever 51 as a part of one shank of a U-sectioned punching formed as in Fig. 13 and having a bushing 51A clinched to it as shown sectionally in Fig. 8. Thus constructed, the lever also includes an upper shank 51B having a perforation 59 alining with the bore of the said bushing and hence coaxial with the pivot axis of the lever, which upper shank also has an additional perforation 58 (spaced from the perforation 59) to which a pull rod 17 is connected as in Fig. 6 for moving the lever to effect an opening of the shutters against the tension of the two springs.

The lever-pivoting pin 57 extends downwards through the said upper perforation 59 in the supporting member, through alined perforations 52A and 52B in both arms of the U shaped pivoting member, through a washer 60 spacing the lower lever part 51 from the lower shank of the pivoting member 52 and through a perforation 61 in the medial portion 56A of the supporting member (of Fig. 10), this perforation being of greater diameter (in the general direction in which the links 50 and 50A extend) than the portion of the pin 57 which extends through it.

To allow for the deviation of the shutter assembly from a right-angled relation to the direction of the pull on the rod which operates the mechanism to open the shutters, I form the supporting member so as to present both the middle (or lever-supporting) base portion 56A and the overhanging arm 54 at an angle to the main portion 56 of the base corresponding to this angle of deviation, namely the angle 62 in Fig. 8.

With the mechanism thus assembled, the double bearings for some of the members and the long bearing afforded for the rocking lever by its bushing portion cooperate for preventing a relative tilting or cramping of the moving parts for increasing their durability, and for reducing friction.

Since the elongation of the perforation 61 in the supporting member permits a limited movement of the pivot pin 57 in the general direction in which the links 50 and 50A extend, the pivoting member is permitted to swing to a limited extent, just as in the previously described embodiment of Figs. 1 and 2, thereby permitting each shutter-closing spring 28 to complete the closing of the shutter with which it is associated. In practice, the initial assembly may be such as to require a compensating action corresponding to only a small fraction of the permitted movement of the pivot member which supports the rocking lever, but the gradual wear of various parts of the shutter assembly is apt to increase the extent of the needed compensation in time, and my mechanism will automatically respond accordingly.

However, while I have illustrated and described my invention in connection with embodiments in which the two sections of the shutter assembly are not in a common general plane, and in which the movement of the pivoting member with respect to the supporting member is limited by the engagement of the lever-pivoting pin with stop portions of the said pivoting member, I do not wish to be limited to these or other details of the construction and arrangement thus described. Many changes could obviously be made without departing either from the general spirit of my invention or from the appended claims, and various features of my invention obviously can also be employed to equal advantage in connection with multiple-sectioned shutters for use in other connections than automobiles.

I claim as my invention:

1. In a mechanism for operating two shutters which have pivoted shutter blades extending in the same general direction, two links each disposed for simultaneously moving the blades of one of the shutters, a lever having two arms thereof respectively connected to the two links, a pivot member upon which the lever is pivoted, and a support, the pivot member being mounted on the support in such a manner as to permit a bodily movement of the pivot member with respect to the support in a plane parallel to that in which the lever is movable.

2. In a mechanism for operating two shutters which have pivoted shutter blades extending in the same general direction, two links each disposed for simultaneously moving the blades of one of the shutters, a lever of the first class having its arms respectively connected to the two links, a pivot member upon which the lever is pivoted, and a support, the pivot member being mounted on the support in such a manner as to permit a bodily movement of the pivot member with respect to the support in the general direction in which both links extend.

3. In a mechanism for operating two shutters which have pivoted shutter blades extending in the same general direction, two links each disposed for simultaneously moving the blades of one of the shutters, a lever having two portions thereof respectively connected to the two links, a pivot member upon which the lever is pivoted, and a support; the pivot member being mounted on the support in such a manner as to permit a bodily movement of the pivot member with respect to the support in the general direction in which both links extend, and means operatively interposed between the pivot member and the support for limiting the said bodily movement of that member.

4. In a mechanism for operating two shutters which have pivoted shutter blades extending in the same general direction, two links each disposed for simultaneously moving the blades of one of the shutters, a lever of the first class having its arms respectively connected to the two links, a pivot member upon which the lever is pivoted, and a support; and means for pivoting the pivot member upon the support on an axis parallel to and spaced from the pivot axis of the lever.

5. In a mechanism for operating two shutters which have pivoted shutter blades extending in the same general direction, two links each disposed for simultaneously moving the blades of one of the shutters, a lever of the first class having its arms respectively connected to the two links, a pivot member upon which the lever is pivoted, and a support; and a pivot pin pivoting the pivot member upon the support on an axis parallel to and spaced from the pivot axis of the lever, the support and the pivot pin having interengageable portions disposed for limiting the movement of the pivot member about the said pivoting means.

6. In a mechanism for operating two shutters which have movable shutter blades extending in the same general direction, two links each disposed for simultaneously moving the blades of one of the shutters, a lever of the first class having its arms respectively connected to the two links, a pivot member upon which the lever is pivoted, and a support, the pivot member being mounted on the support with freedom for to and fro movement in the general direction in which both links extend; and means associated with the pivot member and the support for limiting the said to and fro movement of the pivot member to a small fraction of the rotational movement imparted to the lever during the movement of the shutter blades from their opened to their closed positions.

7. In a mechanism for operating two shutters having movable blades extending in the same general direction, two links each disposed for simultaneously moving all blades of one of the shutters, a lever of the first class having its arms respectively connected to the two links, a stationary support; a pivot member pivoted to the support on an axis extending in the same general direction with the blades of both shutters; and a pivot pin carried by the pivot member and also extending in the said direction, upon which pin the lever is pivoted; the support having stop portions disposed for engaging the said pin to limit the movement of the pivot member with respect to the support to a small fraction of the rotational movement of the lever during the movement of the shutter blades from their opened to their closed positions.

8. A shutter operating mechanism as per claim 7, in which the support has a perforation into which the pivot pin extends, the said perforation having spaced wall portions thereof forming the aforesaid stop portions.

9. Means for simultaneously operating two sets of pivoted shutter blades in a shutter having two stop means respectively associated with the two sets of blades for halting the blades of each set in closed disposition, comprising two blade actuating members respectively pivotally connected with the two sets of blades; a rocking member having two arms respectively connected to the two actuating members, and means for pivotally supporting the rocking member so that this rocks about a substantially stationary axis throughout the movement of both actuating mechanisms while both sets of blades move from their full-opened positions to positions in which the blades of one set are in closed disposition; the same means being arranged for thereafter permitting the rocking member to move about its pivotal connection to the actuating member associated with the closed set of blades, thereby permitting the other actuating member to close the other set of blades.

10. Means for conjointly actuating two sets of pivoted shutter blades in a shutter having two openings respectively associated with the two sets of blades and having two stop means respectively associated with the two sets of blades for halting the blades of each set in closure relation to the opening with which the blades of that set are associated, comprising separate spring means continuously urging each set of blades toward its closure position, two blade-actuating members each operatively connected to the blades of one set and movable against the resistance of the corresponding spring means for opening that set of blades, a reciprocable intermediate member interposed between the two blade-actuating members for compelling the latter members to move simultaneously and substantially symmetrically; and means supporting the intermediate member in such a manner as to permit a limited movement of that member in a direction other than that in which it is reciprocable.

11. Means for actuating a shutter assembly having two sets of parallel and pivotally mounted shutter blades and having portions of the consecutive blades of each set disposed for interengaging to halt the pivotal movement of these blades in their closure positions, comprising two actuating members respectively connected to the two sets of blades, a rocking member having two arms respectively connected to the two actuating members for moving the actuating members simultaneously towards or away from the positions in which the actuating members move all shutter blades toward their closure positions, and means supporting the rocking member; the said supporting means being so connected to the rocking member as to permit an unrestricted rotation thereof about an axis between the said arms, and means associated with the supporting means and operating automatically when the blades of one set have closed before those of the other set, for permitting the rocking member to rock about its connection to the actuating member associated with that set of blades so as to complete the closing of that set of blades.

12. Means for conjointly actuating two sets of upright shutter blades, comprising: two links respectively connected to the two sets of shutter blades, a supporting member including a base portion and a wing portion spaced vertically from and overhanging the base portion; a U-shaped pivot member having its shanks extending between the said portions and pivoted to the supporting member on an axis transverse of the said shanks, and a rocking lever pivoted to the pivot member on an axis parallel to the aforesaid axis and having its lever arms respectively connected to the two links.

13. Means for conjointly actuating two sets of upright shutter blades, comprising: two links respectively connected to the two sets of shutter blades, a supporting member including a base portion and a wing portion spaced from and overhanging the base portion; a U-shaped pivot member having its shanks extending between the said portions and pivoted to the supporting member on an axis transverse of the said shanks, a rocking lever having its arms respectively connected to the two links and having its medial portion disposed between the shanks of the pivot member, and pivoting means extending through the said shanks and the medial portion of the rocking lever for pivoting the rocking lever on the pivot member.

14. A shutter actuating mechanism as per claim 13, in which the pivoting means comprises a pivot pin projecting beyond the rocking lever toward a part of the supporting member, and in which the said part of the supporting member has portions disposed for engaging the pivot pin to limit the pivotal movement of the pivot member with respect to the base member.

15. A shutter actuating mechanism as per claim 13, in which the rocking lever includes a rigid portion extending exteriorly of the pivot member, and in which the pivoting means comprises a pivot pin extending both through the said exteriorly disposed portion of the rocking lever and through the said medial portion of the lever.

LEE B. GREEN.